United States Patent [19]

Fujitaka

[11] Patent Number: 5,949,984
[45] Date of Patent: Sep. 7, 1999

[54] EMULATOR SYSTEM

[75] Inventor: Shigeaki Fujitaka, Tokyo, Japan

[73] Assignee: Mitsubishi Denki Kabushiki Kaisha, Tokyo, Japan

[21] Appl. No.: 08/980,874

[22] Filed: Dec. 1, 1997

[30] Foreign Application Priority Data

Jul. 24, 1997 [JP] Japan ................................. 9-198887

[51] Int. Cl.$^6$ ................................................. G06F 15/16
[52] U.S. Cl. ......................................................... 395/500
[58] Field of Search .............................. 395/500, 701, 395/705; 364/578

[56] References Cited

U.S. PATENT DOCUMENTS 5,717,903  2/1998  Bonola ................................. 395/500
5,721,880  2/1998  McNeill, Jr. et al. .............. 395/500
5,832,251  11/1998  Takahashi ............................ 395/500

*Primary Examiner*—Kevin J. Teska
*Assistant Examiner*—A. S. Roberts
*Attorney, Agent, or Firm*—Burns, Doane, Swecker & Mathis, LLP

[57] ABSTRACT

An emulator system capable of solving a problem of a conventional emulator system in that it requires a gate array for executing a port function of a peripheral emulation chip because external pins of the peripheral emulation chip cannot achieve the port function required in a peripheral emulation mode. The present emulator system has at least two peripheral emulation chips. Each peripheral emulation chip includes a core block for controlling buses, a peripheral function block for achieving functions of a peripheral device, a mode setting circuit for setting a normal mode enabling the core block or the peripheral emulation mode enabling the peripheral function block, external pins, and a link switching circuit for selecting one of the connections of the external pins with the buses and with the peripheral function block.

3 Claims, 6 Drawing Sheets

| MODE SIGNAL: BIT 1 | MODE SIGNAL: BIT 0 | MODE |
|---|---|---|
| 0 | 0 | NORMAL MODE |
| 0 | 1 | PERIPHERAL EMULATION MODE 1 |
| 1 | 1 | PERIPHERAL EMULATION MODE 2 |
| 1 | 0 | INHIBITED COMBINATION |

FIG. 4

| MODE SIGNAL: BIT 1 | MODE SIGNAL: BIT 0 | MODE | TERMINALS CONNECTED WITH TERMINAL x OF SELECTOR 40 |
|---|---|---|---|
| 0 | 0 | NORMAL MODE | TERMINAL a |
| 0 | 1 | PERIPHERAL EMULATION MODE 1 | TERMINAL b |
| 1 | 1 | PERIPHERAL EMULATION MODE 2 | TERMINAL a |
| 1 | 0 | INHIBITED COMBINATION | NONE |

FIG. 5

| MODE SIGNAL: BIT 1 | MODE SIGNAL: BIT 0 | MODE | TERMINALS CONNECTED WITH TERMINAL x OF SELECTOR 41 |
|---|---|---|---|
| 0 | 0 | NORMAL MODE | TERMINAL b |
| 0 | 1 | PERIPHERAL EMULATION MODE 1 | TERMINAL b |
| 1 | 1 | PERIPHERAL EMULATION MODE 2 | TERMINAL a |
| 1 | 0 | INHIBITED COMBINATION | NONE |

2

EMULATOR SYSTEM

BACKGROUND OF THE INVENTION

1. Field of the Invention

The present invention relates to an emulator system in a microcomputer system.

2. Description of Related Art

A conventional emulator system generally emulates using two microcomputer chips, that is, a CPU emulation chip and a peripheral emulation chip: The CPU emulation chip has a bus master function of the CPU, DMAC and the like, that is, the function of accessing the memory and executing instructions read therefrom; and the peripheral emulation chip executes peripheral functions of a timer, serial I/Os, A/D converters or the like.

The CPU emulation chip inputs and outputs all the bits of its address bus and data bus, signals on its control bus such as read/write signals, emulation signals, and signals required for interface with the peripheral emulation chip.

On the other hand, the peripheral emulation chip inputs and outputs the lower bits (eight bits in this case) of its address bus, all the bits of the data bus, signals on its control bus such as read/write signals, and signals required for interface with the CPU emulation chip.

The CPU emulation chip can be implemented either by way of the mode setting of a volume production chip or by developing a dedicated chip. This is because developing the dedicated chips does not become a great burden because one type of CPU emulation chips can fulfill all the requirements of each series of microcomputers.

In contrast with this, a particular type of peripheral emulation chips is required for each type of microcomputers. Hence, developing dedicated peripheral emulation chips becomes a great burden and difficult to implement. Thus, the peripheral emulation chip can be more effectively implemented by way of the mode setting of volume production chips.

FIG. 7 is a schematic block diagram of a conventional emulator system. In FIG. 7, the reference numeral 101 designates a CPU emulation chip which inputs and outputs a 20-bit signal on its address bus, a 16-bit signal on its data bus, control signals on its control bus, emulation signals, and signals required for interface with a peripheral emulation chip.

The reference numeral 102 designates a peripheral emulation chip which inputs and outputs a lower 8-bit signal on its address bus, a 16-bit signal on its data bus, control signals on its control bus, and signals required for interface with the CPU emulation chip 101. The ports P0, P1, P2 and P3 of the peripheral emulation chip 102 are connected to the lower eight bits of its address bus, lower eight bits of its data bus, upper eight bits of the data bus, and its control bus, respectively. The sum total of the 8-bit ports P0, P1, P2, P3 and P4 are 40.

The reference numeral 103 designates a port emulation gate array which emulates the functions of the 8-bit ports P0, P1, P2 and P3, and inputs and outputs signals needed for the emulation such as the signal on the lower 8-bits of the address bus, the signal on the 16-bit data bus, and the control signals on the control bus.

The reference numeral 104 designates an emulator body which includes a memory 108 for storing instructions executed by the CPU emulation chip 101, and carries out the overall control. The emulator body 104 inputs and outputs signals needed for the emulation such as the signal on the 20-bit address bus, the signal on the 16-bit data bus, and the control signals on the control bus.

The reference numeral 105 designates the address bus, 106 designates the data bus, and 107 designates the control bus for carrying control signals such as read/write signals. The ports P0–P3 of the port emulation gate array 103 and the port P4 of the peripheral emulation chip 102 are connected to a user board.

FIG. 8 is a block diagram of the peripheral emulation chip 102. In FIG. 8, the reference numeral 121 designates a mode setting circuit for outputting a mode signal designating a peripheral emulation mode or a normal mode. The mode signal is placed at a "0" level in the normal mode, and a "1" level in the peripheral emulation mode. The reference numeral 122 designates a core block for controlling the 20-bit address bus A0-A19, 16-bit data bus DB0-DB15, and control bus CSP, BHE, RD and WR.

The core block 122 includes a block functioning as a bus master such as a CPU and DMAC. The core block 122, receiving the mode signal, operates as an ordinary CPU or DMAC, and controls the address bus, data bus and control bus if the mode signal designates the normal mode. However, if the mode signal designates the peripheral emulation mode, it disables the CPU and DMAC, and causes those buses to be floating (high impedance).

The reference numerals 123, 124 and 125 each designate a peripheral function block for executing peripheral functions such as a timer, serial I/O, A/D converter, or the like. The peripheral function block 123 comprises a special function register 136 and a peripheral function block body 137, both of which are connected to the address bus, data bus and control bus. When the peripheral function block 123 operates as a serial I/O, the special function register 136 functions as a register for selecting a communication rate and for storing communication data, and the peripheral function block body 137 functions as the main body of the serial I/O.

The reference numerals 126, 128, 130, 132 and 134 designate port P0 circuit, port P1 circuit, port P2 circuit, port P3 circuit, and port P4 circuit, respectively, with which the address bus, data bus and control bus are connected. The reference numerals 127, 129, 131, 133 and 135 each designate a selector having terminals a, b, s and x. The mode signal is connected to the terminal s of each of the selectors 127, 129, 131 and 133 so that each of the selectors connect its terminal a with the terminal x when the mode signal is placed at the "0"0 level (in the normal mode), whereas connect its terminal b with the terminal x when the mode signal is placed at the "1" level (in the peripheral emulation mode). The terminal s of the selector 135 is connected to an output of the special function register 136.

The selector 127 has its terminal x connected to external pins P00–P07, its terminal a to the port P0 circuit 126, and its terminal b to the address bus A0–A7. The selector 129 has its terminal x connected to external pins P10–P17, its terminal a to the port P1 circuit 128, and its terminal b to the lower bits DB0–DB7 of the data bus.

The selector 131 has its terminal x connected to external pins P20–P27, its terminal a to the port P2 circuit 130, and its terminal b to the upper bits DB8–DB15 of the data bus. The selector 133 has its terminal x connected to external pins P30–P37, its terminal a to the port P3 circuit 132, and its terminal b to the control bus. The selector 135 has its terminal x connected to external pins P40–P47, its terminal a to the port P4 circuit 134, and its terminal b to the peripheral function block 123. Here, the external pins P00–P07, P10–P17, P20–P27, P30–P30 and P40–P47 correspond to the port P0, P1, P2, P3 and P4 of FIG. 1, respectively.

The reference numeral 138 designates a ROM which is connected to the address bus, data bus and control bus, and stores instruction codes executed by the CPU in the core block 122. The ROM 138 is also connected to the mode signal which enables it in the normal mode and disables it in the peripheral emulation mode, in which case the address bus, data bus and control bus are made floating.

The reference numeral 139 designates a RAM which is connected to the address bus, data bus and control bus. The RAM 139 is also connected to the mode signal which enables it in the normal mode and disables it in the peripheral emulation mode, in which case the address bus, data bus and control bus are made floating.

Next, the operation of the conventional emulator system will be described.

When the mode setting circuit 121 designates the normal mode; the core block 122, ROM 138 and RAM 139 are all enabled. In addition, since the selectors 127, 129, 131 and 133 each have their terminals x connected to their terminals a, the external pins P00–P07 are connected with the port P0 circuit 126, the external pins P10–P17 are connected with the port P1 circuit 128, the external pins P20–P27 are connected with the port P2 circuit 130, and the external pins P30–P37 are connected with the port P3 circuit 132 so that they can achieve their functions.

Furthermore, the CPU in the core block 122 can read the instructions from the ROM 138 to execute them. When using the peripheral function block 123, the CPU controls the address bus, data bus and control bus, and reads from or writes in the special function register 136 necessary data, thereby establishing the state for using the peripheral function block 123. For example, when the CPU in the core block 122 uses the peripheral function block 123 as a serial I/O for communicating with the outside, the CPU sets the special function register 136 to have the selector 135 connect its terminals b and x. This enables the external pins P40–P47 to be used as the external pins of the serial I/O, thus making the communication possible.

Moreover, controlling the address bus, data bus and control bus, the CPU in the core block 122 can access to the RAM 139, port P0 circuit 126, port P1 circuit 128, port P2 circuit 130, port P3 circuit 132, port P4 circuit 134, and peripheral function blocks 124 and 125.

On the other hand, when the mode setting circuit 121 designates the peripheral emulation mode, the core block 122, ROM 138 and RAM 139 are disabled, and the address bus, data bus and control bus are made floating. In addition, since the mode signal designates the peripheral emulation mode, the selectors 127, 129, 131 and 133 connect the external pins P00–P07 with the address bus A0–A7, the external pins P10–P17 with the data bus DB0–DB7, the external pins P20–P27 with the data bus DB8–DB15, and the external pins P30–P37 with the control bus, respectively.

Thus, the peripheral function blocks 123, 124 and 125 become accessible through the external pins P00–P07, P10–P17, P20–P27 and P30–P37.

The operation in the emulation will now be described with reference to FIGS. 7 and 8. The CPU emulation chip 101, controlling the address bus, data bus and control bus, accesses the memory 108 in the emulator body 104, reads the instruction codes therefrom, and executes the instructions.

Since the mode setting circuit 121 of the peripheral emulation chip 102 designates the peripheral emulation mode in this case, the CPU emulation chip 101 can access to the peripheral function blocks 123, 124 and 125 through the external pins P00–P07, P10–P17, P20–P27 and P30–P37, that is, the port P0, P1, P2 and P3.

For example, when the CPU emulation chip 101 tries to communicate with the outside via the peripheral function block 123 functioning as the serial I/O, it sets the special function register 136 in the peripheral emulation chip 102 such that the external pins P40–P47 of the peripheral emulation chip 102 function as the external pins of the serial I/O, thereby making the communications possible through the port P4.

However, the peripheral emulation chip 102 cannot provide the ports P0, P1, P2 and P3 with the functions of the terminals of the peripheral function blocks because the corresponding external pins P00–P07, P10–P17, P20–P27 and P30–P37 of the peripheral emulation chip 102 are connected to the address bus, lower and upper data bus and control bus, respectively, but cannot be connected to any of the peripheral function blocks.

In view of this, the functions of the ports P0, P1, P2 and P3 are implemented by the port emulation gate array 103. The port emulation gate array 103 have the equivalent functions as those of the port P0 circuit 126, port P1 circuit 128, port P2 circuit 130 and port P3 circuit 132 of the peripheral emulation chip 102. Thus, the CPU emulation chip 101 must access the port emulation gate array 103 when using these ports.

With the foregoing configuration, the conventional emulator system has a problem in that its peripheral emulation chip has its most of its external pins occupied by the address bus, data bus and control bus in the peripheral emulation mode. Accordingly, these external pins cannot implement the port functions of the peripheral function block such as the input/output pins of the serial I/O. Besides, the gate array is required which executes the port functions in behalf of the peripheral emulation chip in the emulator system.

SUMMARY OF THE INVENTION

The present invention is implemented to solve the foregoing problem. It is therefore an object of the present invention to provide an emulator system in which the external pins for the buses can also implement the port functions of the peripheral function blocks.

According to one aspect of the present invention, there is provided an emulator system comprising: an emulator body which includes a memory for storing instructions and performs overall control of the emulator system; a CPU emulation chip for reading the instructions from the memory and for executing them; and N peripheral emulation chips for executing peripheral functions, where N is an integer greater than one, each of the N peripheral emulation chips including: a bus controlled by a bus master; a peripheral function block implementing functions of a peripheral device; M sets of external pins, each set of which is to be connected to an external device, where M is an integer greater than one; a mode setting circuit for producing a mode signal which designates one of a normal mode and N peripheral emulation modes, the normal mode enabling the bus, and each of the N peripheral emulation modes enabling the peripheral function block; and link switching means for connecting, in response to the mode signal, each of the M sets of external pins either to the bus or to the peripheral function block.

Here, in i-th peripheral emulation chip, where i is a positive integer equal to or less than N, the mode setting circuit may set i-th peripheral emulation mode, in which j-th set of external pins is connected to the peripheral function block, where j is a positive integer which varies as i varies.

In the i-th peripheral emulation chip, the link switching means may comprise a first selector for selecting one of the bus and the peripheral function block, and a second selector for connecting one of the bus and an output of the first selector with the j-th set of external pins.

BRIEF DESCRIPTION OF THE DRAWINGS

FIG. 2 is a block diagram showing a peripheral emulation chip of the embodiment 1;

FIG. 3 is a mode table in the embodiment 1;

FIG. 4 is a mode table of a selector 40 in the embodiment 1;

FIG. 5 is a mode table of another selector 41 in the embodiment 1;

DETAILED DESCRIPTION OF THE PREFERRED EMBODIMENTS

The invention will now be described with reference to the accompanying drawings.

Embodiment 1

Figure 1:
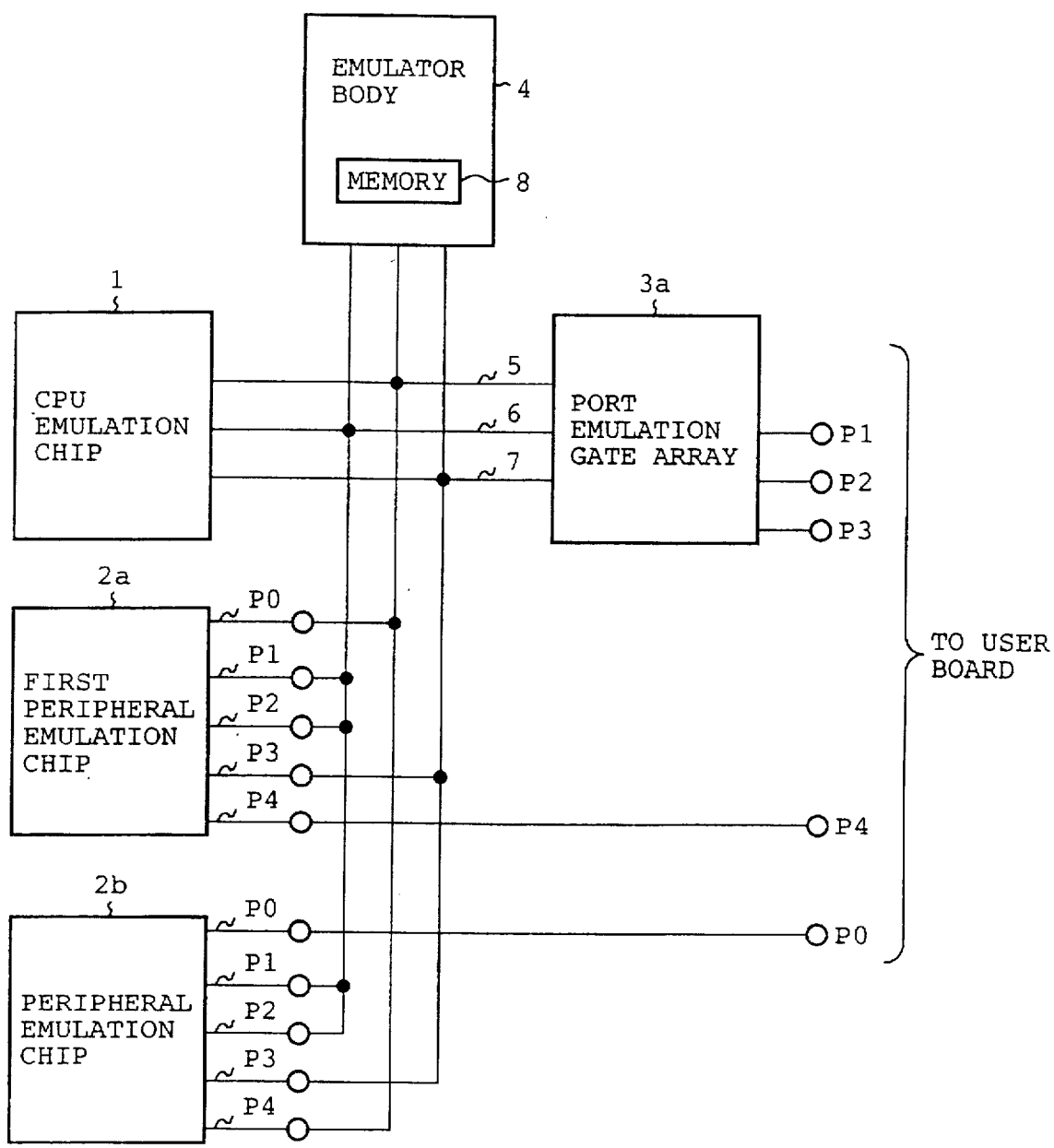
FIG. 1 is a block diagram showing an embodiment 1 of an emulator system in accordance with the present invention.

FIG. 1 is a block diagram showing an embodiment 1 of an emulator system using a microcomputer in accordance with the present invention. In FIG. 1, the reference numeral 1 designates a CPU emulation chip which inputs and outputs signals required for emulation such as a 20-bit signal on its address bus, a 16-bit signal on its data bus, and control signals on its control bus.

The reference numeral 2a designates a first peripheral emulation chip which inputs and outputs signals required for the emulation such as a lower 8-bit signal on its address bus, a 16-bit signal on its data bus, and control signals on its control bus. The ports P0, P1, P2 and P3 of the first peripheral emulation chip 2a are connected to the lower eight bits of its address bus, lower eight bits of its data bus, upper eight bits of the data bus, and its control bus, respectively. The sum total of the 8-bit ports P0, P1, P2, P3 and P4 are 40.

The reference numeral 2b designates a second peripheral emulation chip which inputs and outputs signals required for the emulation such as a lower 8-bit signal on its address bus, a 16-bit signal on its data bus, and control signals on its control bus. The ports P4, P1, P2 and P3 of the second peripheral emulation chip 2b are connected to the lower eight bits of its address bus, lower eight bits of its data bus, upper eight bits of the data bus, and its control bus, respectively. The sum total of the 8-bit ports P0, P1, P2, P3 and P4 are 40.

Thus providing the first and second peripheral emulation chips 2a and 2b is the key factor of the present invention. Although the peripheral emulation chips 2a and 2b have an identical configuration, their modes are set differently as described later.

The reference numeral 3a designates a port emulation gate array which emulates the functions of the 8-bit ports P1, P2 and P3, and inputs and outputs signals required for the emulation such as the signals on the lower 8-bit of the address bus, the signals on the 16-bit data bus, and the control signals on its control bus. Although the conventional system emulates the functions of the ports P0, P1, P2 and P3, the present system does not need to emulate the function of the port P0.

The reference numeral 4 designates an emulator body which includes a memory 108 for storing instructions executed by the CPU emulation chip 1, and carries out the overall control. The emulator body 4 inputs and outputs signals needed for the emulation such as the signals on the 20-bit address bus, the signals on the 16-bit data bus, and the control signals on the control bus.

The reference numeral 5 designates the address bus, 6 designates the data bus, and 7 designates the control bus for carrying control signals such as read/write signals. With regard to the ports, the ports P1–P3 of the port emulation gate array 3a, the port P4 of the first peripheral emulation chip 2a, and the port P0 of the second peripheral emulation chip 2b are connected to a user board.

Figure 2:
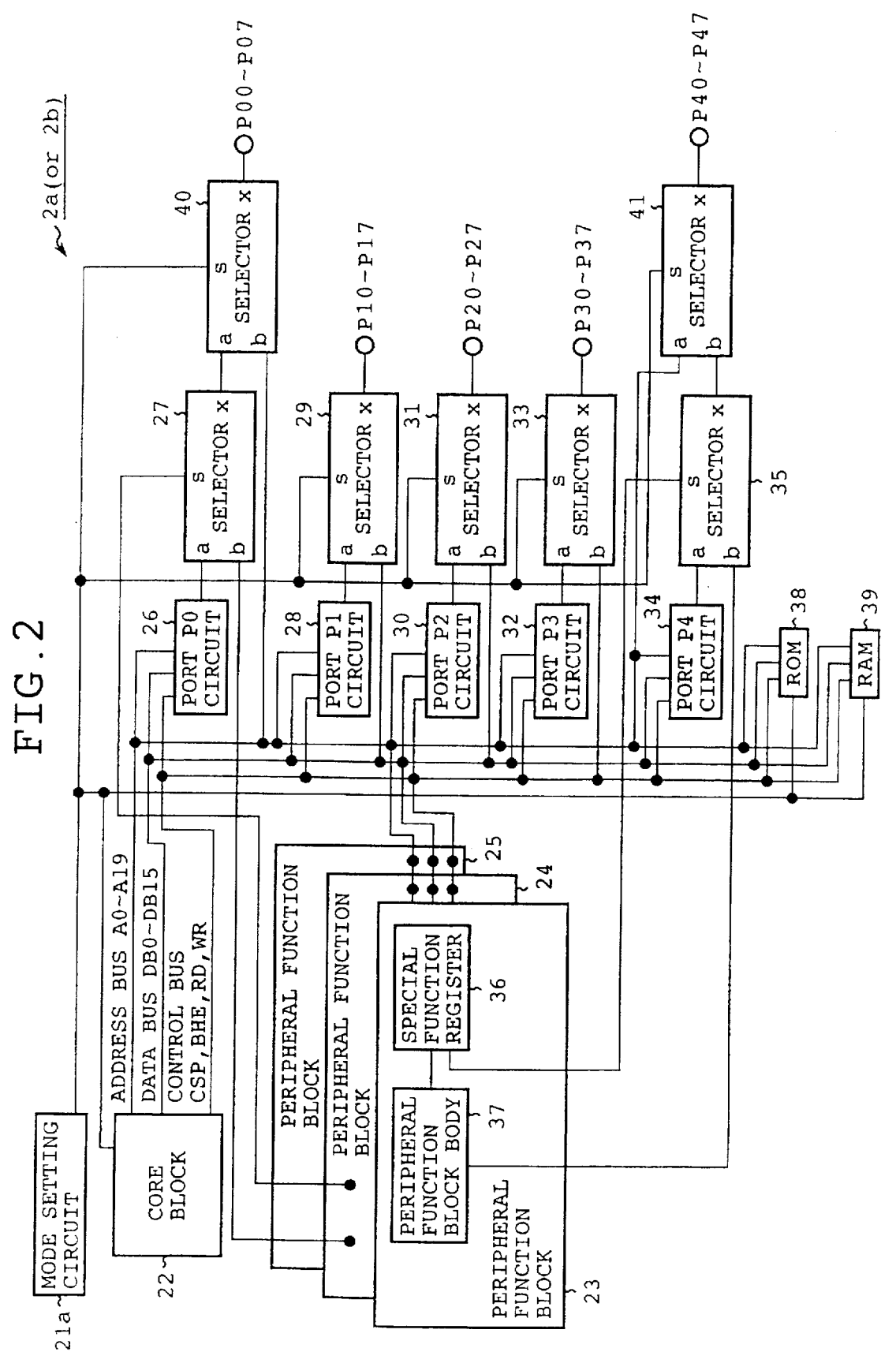

FIG. 2 is a block diagram of the first peripheral emulation chip 2a or the second peripheral emulation chip 2b. In FIG. 2, the reference numeral 21a designates a mode setting circuit for outputting a mode signal designating a peripheral emulation mode or a normal mode. Although the mode setting circuit 121 of the conventional system designates only two modes, the peripheral emulation mode and the normal mode, the mode setting circuit 21a distinguishes three modes, two peripheral emulation modes and the normal mode. One of the two peripheral emulation modes is referred to as a peripheral emulation mode 1, and the other is referred to as a peripheral emulation mode 2. Thus, the mode signal is a 2-bit signal. FIG. 3 is a cross-reference table representing the relationships between the mode signal and the modes.

The reference numeral 22 designates a core block for controlling the 20-bit address bus A0–A19, 16-bit data bus DB0–DB15, and control buses CSP, BHE, RD and WR. The core block 22 includes a block functioning as the bus master such as the CPU and DMAC. The core block 22, receiving the mode signal, operates as the ordinary CPU or DMAC and controls the address bus, data bus and control bus, if the mode signal designates the normal mode. However, if the mode signal designates the peripheral emulation modes, it disables the CPU and DMAC, and makes those buses floating.

The reference numerals 23, 24 and 25 each designate a peripheral function block. Each peripheral function block, as illustrated by the peripheral function block 23, comprises a special function register 36 and a peripheral function block body 37, both of which are connected to the address bus, data bus and control bus. If the peripheral function block 23 operates as a serial I/O, the special function register 36 functions as a register for selecting a communication rate and for storing communication data, and the peripheral function block body 37 functions as the main body of the serial I/O.

The reference numerals 26, 28, 30, 32 and 34 designate port P0 circuit, port P1 circuit, port P2 circuit, port P3 circuit, and port P4 circuit, respectively, with which the address bus, data bus and control bus are connected.

The reference numerals 27, 29, 31, 33 and 35 each designate a selector (link switching circuits) having terminals a, b, s and x. The terminals s of the selectors 29, 31 and 33 are connected to the bit 0 of the mode signal. The mode signal indicating the normal mode causes these selectors to connect the terminal a with the terminal x, whereas the mode signal indicating the peripheral emulation modes causes them to connect the terminal b with the terminal x.

The terminal s of the selector 35 is connected to an output of the special function register 36. The terminal s of the selector 27 is connected to an output of the special function register in the peripheral function block 24.

The reference numerals 40 and 41 each designate a selector (link switching circuits) having terminals a, b, s and x, with the terminal s connected to the 2-bit mode signal. The selector 40 operates as shown in the cross-reference table of FIG. 4, and the selector 41 operates as shown in the cross-reference table of FIG. 5. The selector 27 has its terminal x connected to the terminal a of the selector 40, its terminal a connected to the port P0 circuit 26 and its terminal b connected to the peripheral function block 24.

The selector 29 has its terminal x connected to external pins P10–P17, its terminal a connected to the port P1 circuit 28 and its terminal b connected to the lower bits DB0–DB7 of the data bus. The selector 31 has its terminal x connected to external pins P20–P27, its terminal a connected to the port P2 circuit 30 and its terminal b connected to the upper bits DB8–DB15 of the data bus.

The selector 33 has its terminal x connected to external pins P30–P37, its terminal a connected to the port P3 circuit 32 and its terminal b connected to the control bus. The selector 35 has its terminal x connected to the terminal b of the selector 41, its terminal a connected to the port P4 circuit 34 and its terminal b connected to the peripheral function block body 37 in the peripheral function block 23.

The selector 40 has its terminal x connected to external pins P00–P07, its terminal a connected to the terminal x of the selector 27 and its terminal b connected to the lower bits A0–A7 of the address bus. The selector 41 has its terminal x connected to external pins P40–P47, its terminal a connected to the lower bits A0–A7 of the address bus and its terminal b connected to the terminal x of the selector 35. These selectors constitute the link switching circuits for switching between the links connecting the peripheral function blocks 23–25 with the external pins and the links connecting the buses with the external pins.

The reference numeral 38 designates a ROM which is connected to the address bus, data bus and control bus, and stores instruction codes executed by the CPU in the core block 22. The ROM 38 is also connected to the mode signal which enables it in the normal mode, and disables it in the peripheral emulation modes, in which case the address bus, data bus and control bus are made floating.

The reference numeral 39 designates a RAM which is connected to the address bus, data bus and control bus. The RAM 39 is also connected to the mode signal which enables it in the normal mode, and disables it in the peripheral emulation modes, in which case the address bus, data bus and control bus are made floating.

Next, the operation of the peripheral emulation chip of FIG. 2 will be described.

When the mode setting circuit 21a designates the normal mode, the core block 22, ROM 38 and RAM 39 are all enabled. In addition, since the selectors 29, 31 and 33 each have their terminals x connected to their terminals a, the external pins P10–P17 are connected with the port P1 circuit 28, the external pins P20–P27 are connected with the port P2 circuit 30, and the external pins P30–P37 are connected with the port P3 circuit 32 so that they can achieve their functions.

In addition, since the external pins P40–P47 are connected to the terminal x of the selector 35 via the selector 41 as indicated in FIG. 5 in the normal mode, the external pins P40–P47 functions as the port of the port P4 circuit 34 or that of the peripheral function block 23. Likewise, since the external pins P00–P07 are connected to the terminal x of the selector 27 via the selector 40 as indicated in FIG. 4 in the normal mode, the external pins P00–P07 functions as the port of the port P0 circuit 26 or that of the peripheral function block 24.

Furthermore, the CPU included in the core block 22 can read the instructions from the ROM 38 to execute them. To use the peripheral function block 23, the CPU controls the address bus, data bus and control bus, and reads from or writes in the special function register 36 necessary data, thereby establishing the conditions for using the peripheral function block 23. For example, when the peripheral function block 23 operates as a serial I/O for communicating with the outside, the CPU in the core block 22 sets the special function register 36 such that the selector 35 connects its terminal b with terminal x. This enables the external pins P40–P47 to be used as the external pins of the serial I/O, thus making the communication possible.

The peripheral function block 24 can be used in the same manner. Moreover, the CPU in the core block 22, controlling the address bus, data bus and control bus, can access to the RAM 39, port P0 circuit 26, port P1 circuit 28, port P2 circuit 30, port P3 circuit 32, port P4 circuit 34, and peripheral function blocks 24 and 25.

On the other hand, when the mode setting circuit 21a designates the peripheral emulation mode 1, the core block 22, ROM 38 and RAM 39 are disabled, and the address bus, data bus and control bus are made floating. In addition, since the bit 0 of the mode signal is set at the "1" level which designates the peripheral emulation modes 1 and 2, the selectors 29, 31 and 33 connect the external the external pins P10–P17 with the data bus DB0–DB7, the external pins P20–P27 with the data bus DB8–DB15, and the external pins P30–P37 with the control bus, respectively, through their terminals x and b.

In addition, since the bits 0 and 1 of the mode signal are placed at the "1" and "0" levels, respectively, in the peripheral emulation mode 1 as shown in FIG. 3, the selector 40 connects the external pins P00–P07 with the A0–A7 of the address bus through its terminals x and b, whereas the selector 41 connects the external pins P40–P47 with the peripheral function block 23 or port P4 circuit 34 through its terminals x and b and the selector 35.

Thus, the peripheral function blocks 23, 24 and 25 become accessible through the external pins P00–P07, P10–P17, P20–P27 and P30–P37.

Next, when the mode setting circuit 21a designates the peripheral emulation mode 2, the core block 22, ROM 38 and RAM 39 are disabled, and the address bus, data bus and control bus are made floating. In addition, since the bit 0 of the mode signal is placed at the "1" level which designates the peripheral emulation modes 1 and 2, the selectors 29, 31 and 33 connect the external pins P10–P17 with the data bus DB0–DB7, the external pins P20–P27 with the data bus DB8–DB15, and the external pins P30–P37 with the control bus, respectively, through their terminals x and b.

Besides, since the bits 0 and 1 of the mode signal are both placed at the "1" level in the peripheral emulation mode 2 as shown in FIG. 3, the selector 40 connects the external pins P00–P07 with the port P0 circuit 26 or peripheral function block 24 through its terminals x and a and the selector 27, whereas the selector 41 connects the external pins P40–P47 with the A0–A7 of the address bus through its terminals x and a.

Thus, the peripheral function blocks 23, 24 and 25 become accessible through the external pins P40–P47, P10–P17, P20–P27 and P30–P37.

The operation in the emulation mode will now be described with reference to FIGS. 1 and 2. In the emulation mode, the first peripheral emulation chip 2a and second peripheral emulation chip 2b are set by their mode setting circuits 21a at the peripheral emulation modes 1 and 2, respectively, for example.

The CPU emulation chip 1, controlling the address bus, data bus and control bus, accesses the memory 8 in the emulator body 4, reads the instruction codes therefrom, and executes the instructions.

Since the mode setting circuit 21a of the first peripheral emulation chip 2a designates the peripheral emulation mode 1 in this case, the CPU emulation chip 1 can access to the peripheral function blocks 23, 24 and 25 through the external pins P00–P07, P10–P17, P20–P27 and P30–P37.

For example, when the CPU emulation chip 1 tries to communicate with the outside via the peripheral function block 23 functioning as the serial I/O, it sets the special function register 36 in the first peripheral emulation chip 2a such that the external pins P40–P47 of the first peripheral emulation chip 2a function as the external pins of the serial I/O, thereby making the communications possible through the port P4.

On the other hand, since the mode setting circuit 21a of the peripheral emulation chip 2b designates the peripheral emulation mode 2 in this case, the CPU emulation chip 1 can access to the peripheral function blocks 23, 24 and 25 through the external pins P40–P47, P10–P17, P20–P27 and P30–P37.

Thus, the first peripheral emulation chip 2a can emulate the functions of the port P4, though it cannot emulate the functions of the ports P0, P1, P2 and P3 because it uses its external pins P00–P07, P10–P17, P20–P27 and P30–P37 as the address bus, data bus and control bus.

Likewise, although the peripheral emulation chip 2b can emulate the functions of the port P0, though it cannot emulate the functions of the ports P4, P1, P2 and P3 because it uses its external pins P40–P47, P10–P17, P20–P27 and P30–P37 as the address bus, data bus and control bus.

As a result, it is possible to emulate the functions of the port P4 by the first peripheral emulation chip 2a, and those of the port P0 by the peripheral emulation chip 2b. The functions of the remaining ports P1, P2 and P3 can be emulated by the port emulation gate array 3a.

As described above, the port P0 as well as the port 4 can have the port functions of the peripheral function block in the present embodiment 1.

Embodiment 2

Figure 6:
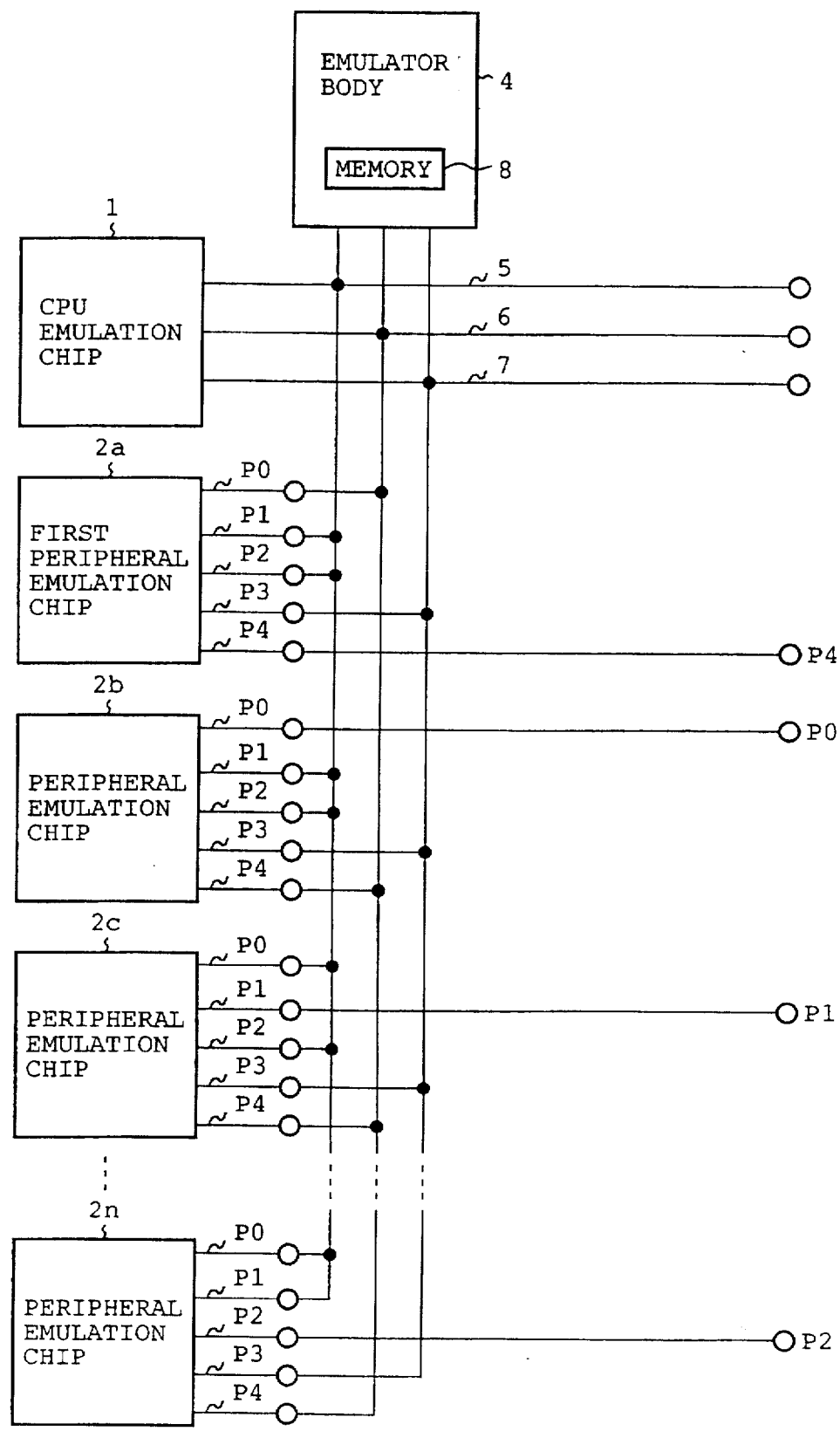
FIG. 6 is a block diagram showing an embodiment 2 of the emulator system in accordance with the present invention.
Figure 7:
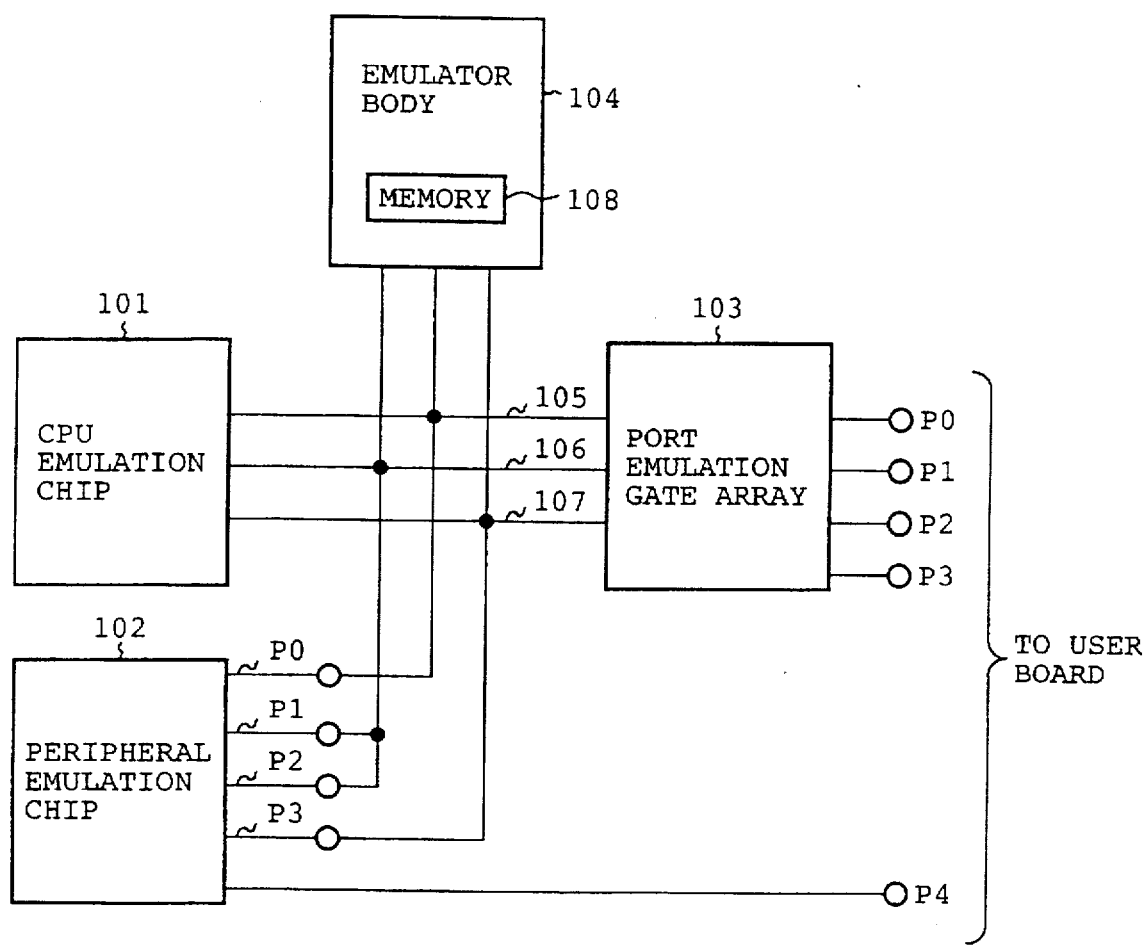
FIG. 7 is a block diagram showing a conventional emulator system.
Figure 8:
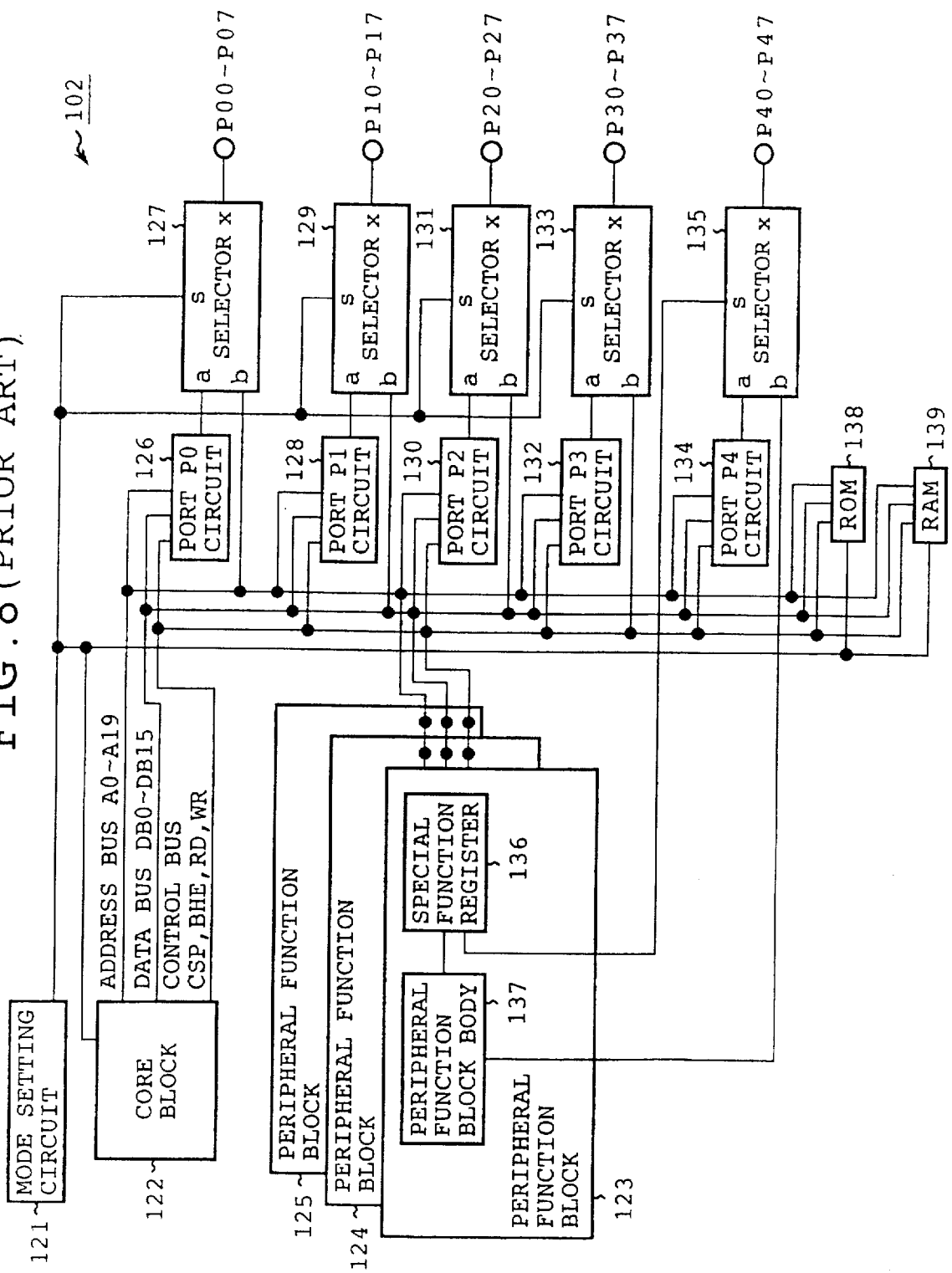
FIG. 8 is a block diagram showing the peripheral emulation chip of the conventional emulator system as shown in FIG. 7.

FIG. 6 is a block diagram showing an embodiment 2 of the emulator system in accordance with the present invention. Although the embodiment 1 includes only two peripheral emulation modes and hence two peripheral emulation chips to emulate the ports P4 and P0, the present embodiment 2 includes n peripheral emulation modes and n peripheral emulation chips from first peripheral emulation chip 2a to peripheral emulation chip 2n, with removing the port emulation gate array 3a, so that the peripheral emulation chip 2c can emulate the function of the port P1, . . . , the peripheral emulation chip 2n can emulate the function of the port P2, etc.

To implement this, the peripheral emulation chips 2c–2n each have selectors corresponding to the selectors 40 and 41 connected to the external pins P10–P17, P20–P27 and P30–P37, thereby changing the links by the signals applied to their terminals s. Thus, a more number of the ports can have the port functions of the peripheral function blocks without the port emulation gate array.

As described above, the embodiments 1 and 2 comprise at least two peripheral emulation chips, each of which includes the mode setting circuit and a link switching circuit. Each of the peripheral emulation chips switches between the normal mode and the multiple peripheral emulation modes, in which the normal mode enables the core block to control the respective buses, and the multiple peripheral emulation modes enable the peripheral function blocks. The link switching circuit, in response to the modes set by the mode setting circuit, selects one of the connections of the external pins with the peripheral function blocks or with the buses. This makes it possible for the external pins provided for the buses in the emulator system to share the port functions for the peripheral function blocks, thereby preventing the external pins from being unduly increased.

What is claimed is:

1. An emulator system comprising:
   an emulator body which includes a memory for storing instructions and performs overall control of the emulator system;
   a CPU emulation chip for reading the instructions from said memory and for executing them; and
   N peripheral emulation chips for executing peripheral functions, where N is an integer greater than one, each of said N peripheral emulation chips including:
   a bus controlled by a bus master;
   a peripheral function block implementing functions of a peripheral device;
   M sets of external pins, each set of which is to be connected to an external device, where M is an integer greater than one;
   a mode setting circuit for producing a mode signal which designates one of a normal mode and N peripheral emulation modes, said normal mode enabling said bus, and each of said N peripheral emulation modes enabling said peripheral function block; and
   link switching means for connecting, in response to said mode signal, each of said M sets of external pins either to said bus or to said peripheral function block.

2. The emulator system as claimed in claim 1, wherein in i-th peripheral emulation chip, where i is a positive integer equal to or less than N, said mode setting circuit sets i-th peripheral emulation mode, in which j-th set of external pins are connected to said peripheral function block, where j is a positive integer which varies as i varies.

3. The emulator system as claimed in claim 2, wherein in said i-th peripheral emulation chip, said link switching means comprises a first selector for selecting one of said bus and said peripheral function block, and a second selector for connecting one of said bus and an output of said first selector with said j-th set of external pins.

* * * * *